J. J. STORER.
Purifying Coal.
No. 2,629. Reissued May 28, 1867.
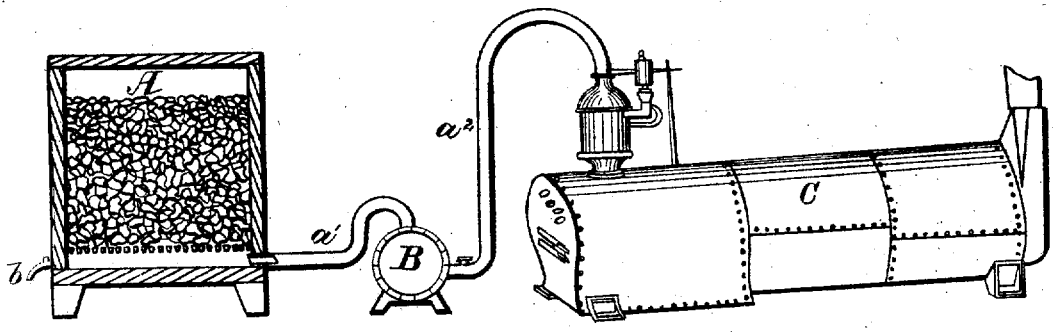
Witnesses;
E. A. Raymond
Inventor;
Jacob J. Storer.
by his Attorney
Thos. Dwight Curtis
N. PETERS, Photo-Lithographer, Washington, D. C.

UNITED STATES PATENT OFFICE.

JACOB J. STORER, OF BOSTON, MASSACHUSETTS.

IMPROVEMENT IN DESULPHURIZING COAL AND ORES.

Specification forming part of Letters Patent No. 32,012, dated April 9, 1861; Reissue No. 2,629, dated May 28, 1867.

*To all whom it may concern:*

Be it known that I, JACOB J. STORER, formerly of Philadelphia, in the county of Philadelphia and State of Pennsylvania, now of Boston, in the State of Massachusetts, have invented a certain new and useful Improvement in the Process of Desulphurizing Coals; and I do hereby declare that the following is a full, clear, and exact description of the same, reference being had to the accompanying drawing, making part of this specification.

The nature of my invention consists, first, in forcing into the interstices of coals containing sulphurous impurities, by the pressure of steam, and either dissolved in it or mechanically conveyed by it, chemicals proper to neutralize such sulphurous impurities; and, second, in the employment of salts of ammonia for this purpose.

For the sake of illustration I describe a suitable apparatus for the proper conducting of my process, premising, however, that I do not confine myself to any particular apparatus, as an apparatus of different detail may be constructed and arranged well adapted to the purpose, if it proceeds upon the principle of employing the pressure of steam to introduce the chemicals to their desired place.

The coals to be desulphurized are placed in a suitable receptacle or close box, A, into which a pipe, *a*, is fitted, provided with a cock, *b*. Another pipe, *a'*, connects A with a vessel, B, in which the chemical ingredients to be forced by steam-pressure into the interstices of the coals are placed. A steam-boiler, C, is connected by the pipe $a^2$ with the vessel B. Steam being raised in the boiler C passes through the vessel B, carrying with it small quantities of the chemicals contained therein, and thus impregnated enters receptacle A, containing the coals. The quantity and pressure of the steam employed is regulated by cock *b*, and the chemicals are by said steam-pressure forced into the interstices of the coal, and deposited where they can neutralize the sulphur at the time of burning the coal. I have found that a mixture about in the proportion of four parts of carbonate of ammonia, and one part each of sal-ammoniac, carbonate of potash, and quicklime, and forced by pressure of steam, as described, into the interstices of coals, will give good results, and I consider the process with these ingredients more efficient and cheaper than any other heretofore known. The quantity of chemicals to be used will be readily indicated by the amount of sulphur to be neutralized.

I claim as my invention and desire to secure by Letters Patent—

1. The process, substantially as described, of forcing into the interstices of coals containing sulphurous impurities, by the pressure of steam, and either dissolved in it or mechanically conveyed by it, chemicals proper to neutralize the sulphurous impurities.

2. The employment of salts of ammonia, forced by pressure of steam into the interstices of coals, as and for the purpose described.

JACOB J. STORER.

Witnesses:
THOS. WM. CLARKE,
CHAS. M. NICKERSON.